US008134796B2

(12) United States Patent
Bedillion

(10) Patent No.: US 8,134,796 B2
(45) Date of Patent: *Mar. 13, 2012

(54) EMBEDDED TRACK INFORMATION FOR PATTERNED MEDIA

(75) Inventor: Mark David Bedillion, Gibsonia, PA (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/904,910

(22) Filed: Oct. 14, 2010

(65) Prior Publication Data

US 2011/0032637 A1    Feb. 10, 2011

Related U.S. Application Data

(63) Continuation of application No. 12/166,913, filed on Jul. 2, 2008, now Pat. No. 7,835,094.

(51) Int. Cl.
*G11B 5/596* (2006.01)
(52) U.S. Cl. .................. 360/77.06; 360/48; 360/77.02
(58) Field of Classification Search .......... None
See application file for complete search history.

(56) References Cited

U.S. PATENT DOCUMENTS

| 6,576,113 | B1 | 6/2003 | Scherer et al. | |
|---|---|---|---|---|
| 6,977,108 | B2 | 12/2005 | Hieda et al. | |
| 6,999,279 | B2 | 2/2006 | Lundstrom | |
| 7,643,235 | B2 | 1/2010 | Erden et al. | |
| 7,688,535 | B2 * | 3/2010 | Erden et al. | 360/40 |
| 7,706,092 | B2 * | 4/2010 | Ling et al. | 360/48 |
| 7,782,561 | B2 * | 8/2010 | Albrecht et al. | 360/48 |
| 2002/0034666 | A1 | 3/2002 | Kiely | |
| 2003/0133213 | A1 | 7/2003 | Rubin et al. | |
| 2003/0234470 | A1 | 12/2003 | Haan et al. | |
| 2005/0157597 | A1 | 7/2005 | Sendur et al. | |
| 2005/0271819 | A1 | 12/2005 | Wago et al. | |
| 2006/0126474 | A1 | 6/2006 | Hanks | |
| 2008/0002269 | A1 | 1/2008 | Sakurai et al. | |
| 2009/0067078 | A1 | 3/2009 | Min et al. | |

FOREIGN PATENT DOCUMENTS

JP    2000215441 A  *  8/2000

* cited by examiner

*Primary Examiner* — Jason Olson
(74) *Attorney, Agent, or Firm* — Ladas & Parry, LLP

(57) ABSTRACT

A bit-patterned magnetic media (BPM) includes with respect to each data track a first sub-track and a second sub-track, each sub-track comprised of a plurality of bit-islands. A transducer head placed over a data track generates a readback signal. Channel response circuitry demodulates the readback signal and detects fine positioning information based on a comparison of a readback signal generated in response to the first sub-track and a readback signal generated in response to the second sub-track.

11 Claims, 5 Drawing Sheets ized to detect track information based on variations in
EMBEDDED TRACK INFORMATION FOR PATTERNED MEDIA

CROSS REFERENCE TO RELATED APPLICATION(S)

This application is a continuation of U.S. patent application Ser. No. 12/166,913, entitled "EMBEDDED TRACK INFORMATION FOR PATTERNED MEDA", filed Jul. 2, 2008 by Mark David Bedillion.

BACKGROUND

The present invention relates to a patterned magnetic media, and more particularly to a patterned media having variations in bit-island sizes that allows for the encoding of track identification (ID) information.

Disc drives are typically organized into a plurality of concentric tracks on one or more disc surfaces. As the disc spins, a magnetic transducer positioned over a particular concentric track senses magnetic transitions along the track. In response to the sensed magnetic transitions, the transducer head is able to retrieve user data stored on the concentric tracks.

Accurate retrieval of user data requires accurate positioning of the transducer head over the desired track. To this end, disc drives are typically encoded with servo sectors that uniquely identify each concentric track on the disc surface. The surface of a disc is therefore divided into data fields capable of storing user data and servo fields used to identify individual tracks. Servo fields are oftentimes positioned at regular intervals around the circumference of the disc, extending in a wedge-like fashion from the center to the outer circumference of the disc.

However, including dedicated servo fields comes at the expense of user data capacity as servo sector fields cannot be written with user data. Extensive work has been done in the field of minimizing overhead associated with servo fields in an effort to allocate more space on a disc to storing user data. A system that removes the need for dedicated or embedded servo fields would therefore be beneficial in improving the storage capacity of disc drives.

SUMMARY

The present invention relates to a disc drive system employing a bit-patterned magnetic medium (BPM). The BPM includes at least a first data track having a first sub-track and a second sub-track, wherein each of the first sub-track and the second sub-track are comprised of bit-islands. A transducer head is selectively positioned over a desired data track, wherein the transducer head generates an amplitude-modulated readback signal in response to the bit-islands associated with the first sub-track and the second sub-track. Channel response circuit demodulates the readback signal generated by the transducer head and detects fine positioning information based on a comparison of a readback signal generated in response to the first sub-track and a readback signal generated in response to the second sub-track.

DETAILED DESCRIPTION

Bit-patterned magnetic media (BPM) have been proposed as a means for preventing magnetization reversal due to the superparamagnetic effect. A patterned medium may include a plurality of discrete, independent regions of magnetic material that form discrete, independent magnetic elements (known as "bit-islands"), which function as recording bits in the medium. The bit-islands are arranged in a regular pattern over the medium substrate. Typically, each bit or element has a small size and magnetic anisotropy such that, in the absence of an applied magnetic field, the magnetic moment of each bit-island is aligned along the same magnetic easy axis.

The present invention provides for the encoding of track information within data sectors based on variations in the size of bit-islands. Individual track identifications previously encoded within servo sectors are instead encoded with data sectors by selectively sizing the size of bit-islands making up each track. The resulting pattern of regular-sized bit-islands and larger bit-islands can be decoded based on the resulting amplitude-modulated readback signal generated in response to the variations in bit-island size.

Figure 1:
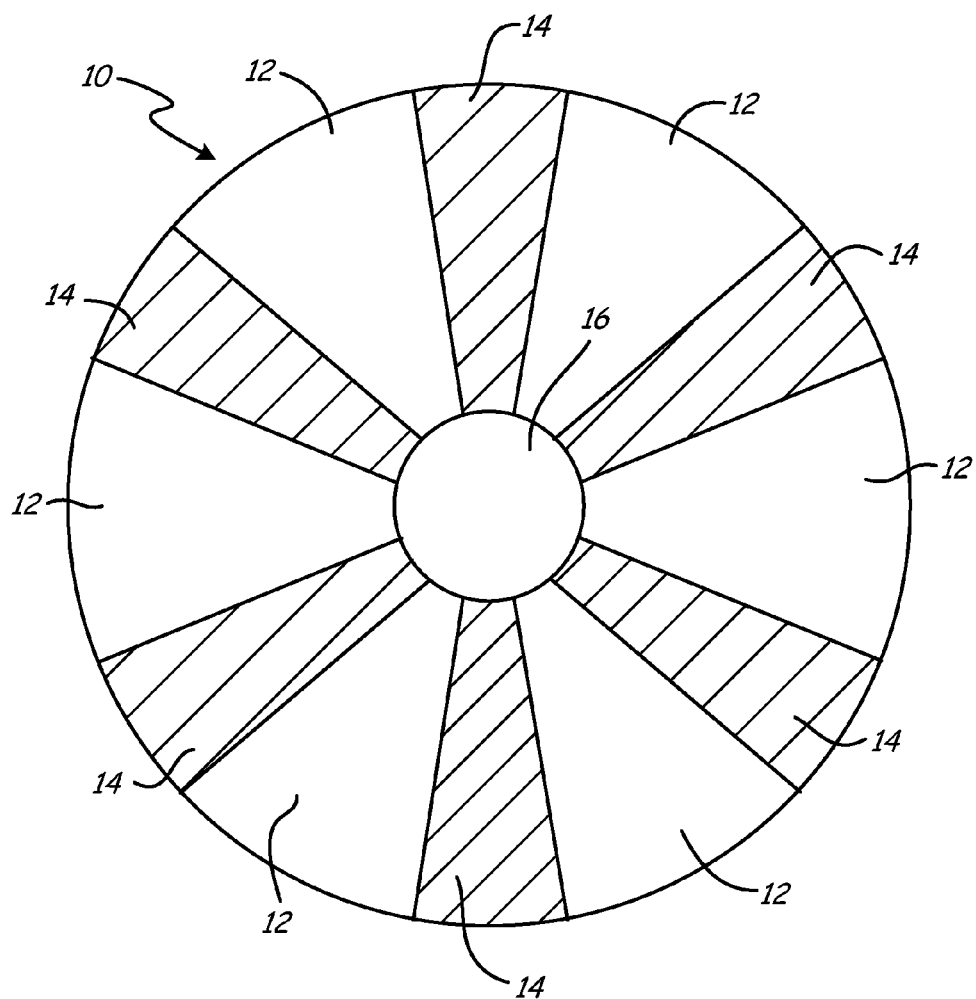
FIG. 1 is a top view of the surface of a disc drive divided into data fields and sector fields as known in the prior art.

FIG. 1 is a top view illustrating the surface of a magnetic media 10, such as a disc, as known in the prior art. Disc 10 is divided into data sectors 12 and servo sectors 14. Servo sectors 14 are embedded with positional information that is used by a transducer head to locate a particular data track. Each servo sector 14 may be comprised of several individual fields, such as a preamble field, address mark field, track address field, wedge address field, and servo bursts field. Each field provides information to properly position the transducer head over a desired track. For instance, the track address field provides coarse information regarding the position of the transducer head relative to other tracks. Other fields, such as the servo burst field, are used to determine the fine position of the head relative to its current track center. The signal resulting from the combination of the coarse and fine measurements is referred to as the positional error signal (PES). Positional information provided by servo sectors 14 comes at the expense of storage space available to data sectors 12.

A disc drive system would typically include a means for positioning a transducer head over a desired track of disc 10. As the transducer head passes over servo sectors 14, PES data associated with the data track is read and used as feedback to position the transducer head over a desired track.

Figure 2:
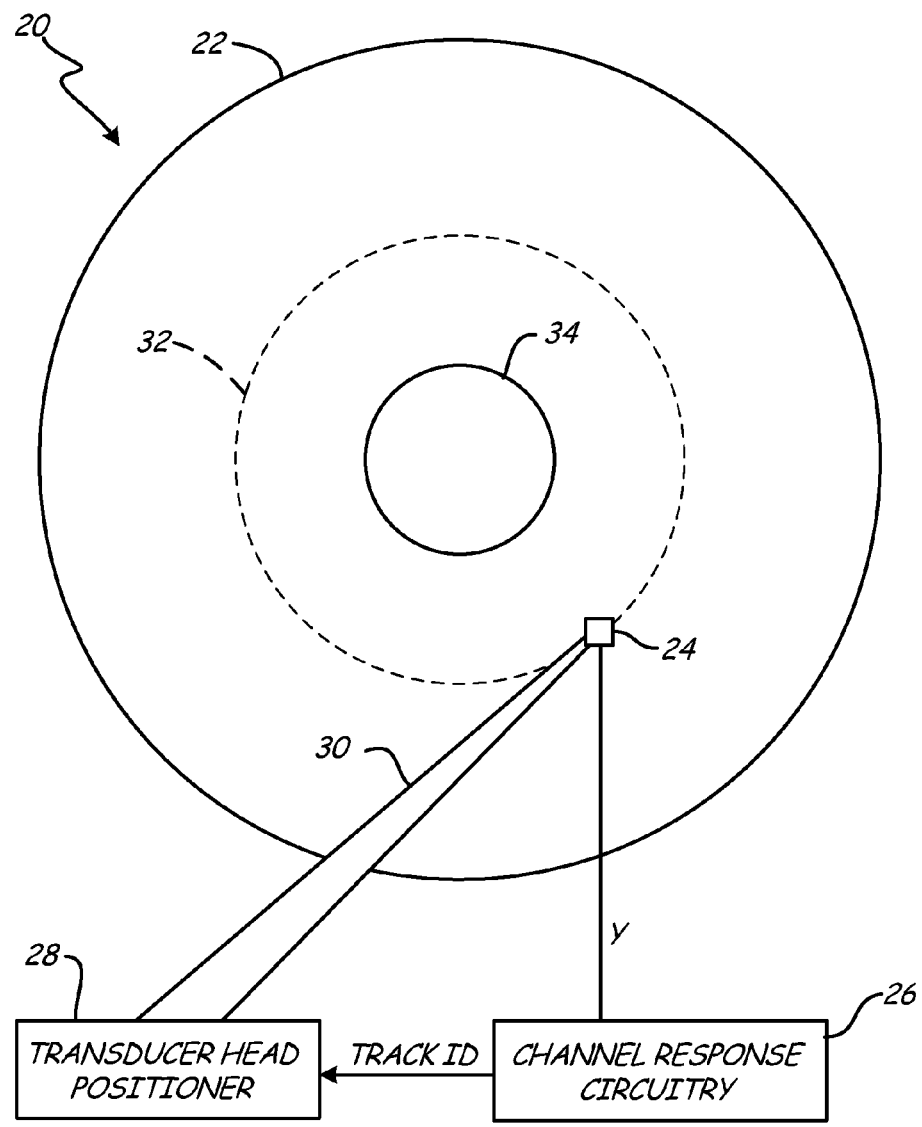
FIG. 2 is a block diagram of a disc drive system of the present invention.

FIG. 2 is a block diagram of a disc drive system 20 of the present invention. Disc drive system 20 includes bit-patterned magnetic media (BPM) 22, transducer head 24, channel response circuitry 26, transducer head positioner 28, actuator 30 and spindle 34. BPM 22 includes a plurality of individual data tracks located circumferentially around BPM 22, as indicated by dashed line 32. The topology of the individual data tracks is described in more detail with respect to FIGS. 3, 4A and 4B. In particular, the size of the bit-islands making up each data track includes both regular bit-islands and large bit-islands. As spindle 34 causes BPM 22 to spin, transducer head 24 is positioned over a desired portion of the disc. In response to the variations in size of the individual bit-islands making up each data track, transducer head 24 generates an amplitude-modulated readback signal (labeled 'y') that is demodulated by channel response circuitry 26. Based on the demodulated readback signal, channel response circuitry 26 is able to detect the track ID over which transducer head 24 is located. The track identification (ID) is provided as feedback to transducer head positioner 28, which employs the track ID data to verify and position transducer head 24 over a desired track. A benefit of disc drive system 20 is the ability to minimize or eliminate the need for a dedicated servo sector format such as the one shown in FIG. 1. Rather, in an exemplary embodiment larger portions of BPM 22 may be employed by data sectors. In another exemplary embodiment, all servo sector information is derived from the data tracks, allowing the entire surface of BPM 22 to be allocated to data sectors.

Figure 3:
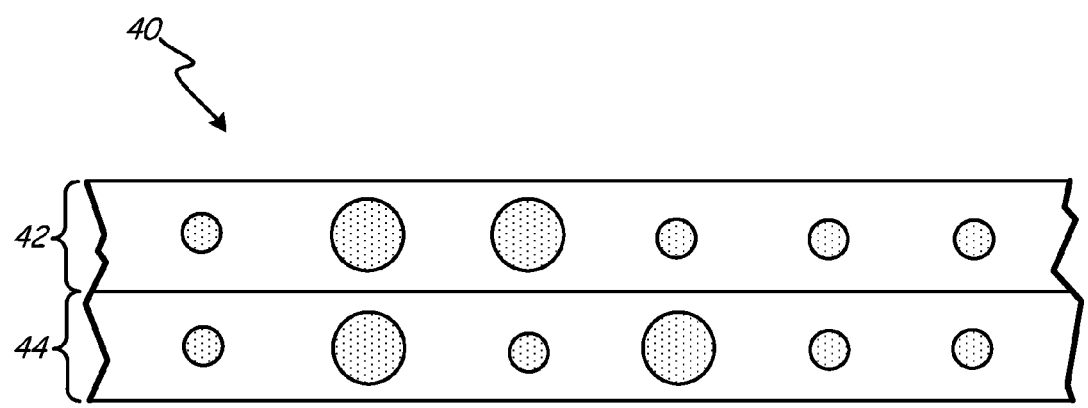
FIG. 3 is a top view of the surface of a disc drive illustrating a staggered bit-patterned media as known in the prior art.

FIG. 3 is a top view of an exemplary embodiment of a bit-patterned media (BPM) 40, which illustrates in additional detail the variations in size of individual bit-islands. In particular, FIG. 3 illustrates the embedding of track identification information within a data track based on variations in the size of individual bit-islands. For purposes of simplifying the discussion, only two data tracks, data track 42 and data track 44, respectively, are illustrated.

Typically, bit-patterned medium are divided into servo sectors and data sectors. Track identification information is stored within the servo sector. In contrast, the embodiment illustrated in FIG. 3 embeds the track identification information onto the data track through the use of bit-island size modulation (i.e., selectively varying the size of the bit-islands). For instance, data track 42 consists of a plurality of regular bit-islands (small shaded circles) as well as a plurality of large bit-islands (large shaded circles). The placement of the regular bit-islands and large bit-islands defines a first pattern. Similarly, data track 44 consists of a plurality of regular bit-islands and large bit-islands. The placement of the regular bit-islands and large bit-islands associated with data track 44 defines a second pattern slightly different than the first pattern.

A transducer head (e.g. as shown in FIG. 2), moving left-to-right, generates a readback signal in response to the polarization of the bit-islands. In addition, the amplitude of the readback signal varies depending on the geometric size of the bit-island. Large bit-islands increase the magnitude of the readback signal relative to the regular bit-islands. In this way, as transducer head moves over a particular data track, an amplitude modulated readback signal is generated in response to the size of the bit-islands. Demodulation of the readback signal allows the particular pattern of large bit-islands and small bit-islands associated with a particular track to be detected. In this way, track identification data can be encoded within data tracks of a bit-patterned media, obviating the need for dedicated servo fields for storing track identification data and thereby allowing a greater portion of a BPM to be allocated to data sectors.

For instance, a transducer head positioned over data track 42, moving left-to-right, would sense the following first pattern of bit-island sizes:

Pattern (track 42): R-L-L-R-R-R

In contrast, a transducer head positioned over data track 44, moving left-to-right, would sense the following, slightly different second pattern of bit-island sizes:

Pattern (track 44): R-L-R-L-R-R

Detecting the pattern of bit-island sizes associated with a particular data track allows channel response circuitry (e.g., as shown in FIG. 2) to identify the data track over which the transducer head is located without the use of a dedicated servo sector field storing the track identification data. In this way, the embodiment illustrated in FIG. 3 increases the overall storage capacity of a particular disc by reducing the data that must be stored in the servo sector field.

Figure 4A:
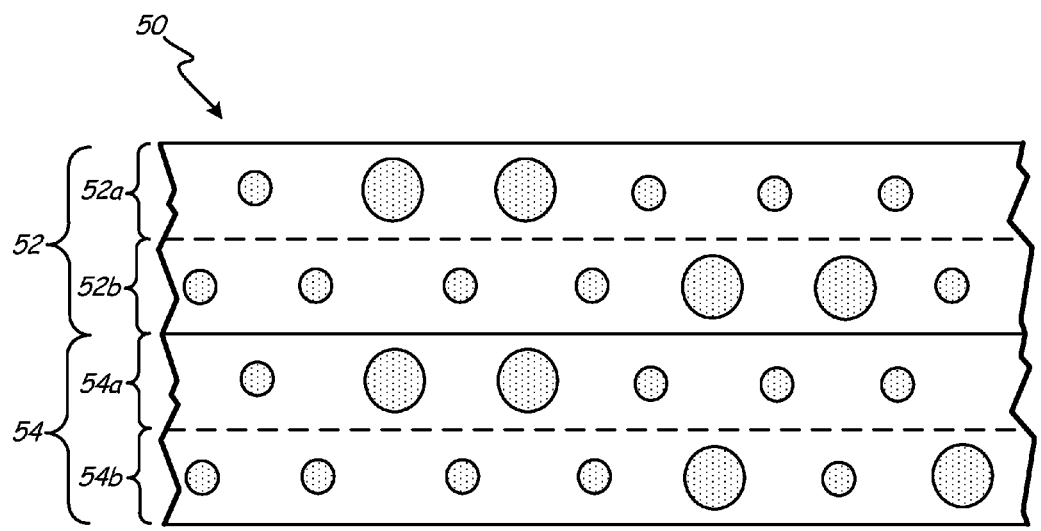
FIGS. 4A and 4B are top views of a surface of a disc drive illustrating the encoding of track information by varying bit-island size.
Figure 4B:
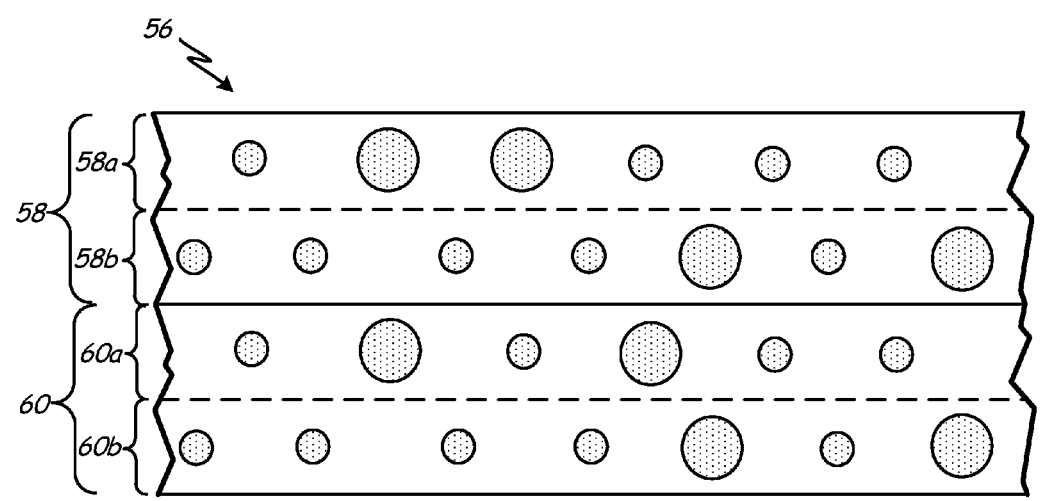

FIGS. 4A and 4B are top views of exemplary embodiments of bit-patterned media in which the bit-island size modulation is employed in a staggered bit-island topology. Once again, for the sake of simplicity only two data tracks have been illustrated with respect to each topology. As described in additional detail below, a benefit of employing a staggered bit-island topology including track identification through bit-island size modulation is the ability to further reduce data stored in the servo sector. In particular, the staggered bit-island topology allows for the fine-positioning of a transducer head over the desired track based on the magnitude of the readback signals associated with a top sub-track and bottom sub-track. This further reduces the number of fields that must be included in the servo sector format. In other embodiments, a non-staggered bit-island topology may be used in conjunction with data tracks comprised of a plurality of sub-tracks.

With respect to FIG. 4A, BPM 50 includes data tracks 52 and 54. Data track 52 includes first sub-track 52a and second sub-track 52b, and data track 54 includes first sub-track 54a and second sub-track 54b. A transducer head (e.g., as shown in FIG. 2), positioned over data track 52, has a width sufficient to allow the transducer head to extend over at least a portion of both first sub-track 52a and second sub-track 52b. In the exemplary embodiment shown in FIG. 4A, the bit-patterned topology is commonly referred to as a staggered bit-pattern topology because second sub-track 52b is staggered or offset in the cross-track direction relative to first sub-track 52a. Reading data track 52 therefore requires data to be alternatively read from first sub-track 52a and second sub-track 52b.

A benefit of employing data tracks comprised of two or more sub-tracks is the ability to generate positional error signals (PES) based on the relative strength of the readback signal generated with respect to each sub-track. In the example shown in FIG. 4A (or FIG. 4B), for the case when the transducer is positioned over data track 52 this would include comparing the strength of the readback signal generated with respect to first sub-track 52a with the strength of the readback signal generated with respect to second sub-track 52b. Based on the results, the transducer head can be finely positioned over data track 52.

In an exemplary embodiment, a simple detector can be constructed to generate a PES through the moving average quantity of the respective readback signals.

$$PES_k = \left| \frac{y_a(k)}{y_b(k)} \right| \tag{1}$$

In this example, $y_a(k)$ refers to the readback signal generated with respect to a first sub-track, and $y_b(k)$ refers to the readback signal generated with respect to a second sub-track. This allows the transducer head to be finely positioned over the center of a desired track based on the data sectors themselves, without requiring a dedicated servo burst.

This method of finely-positioning the transducer head based on the relative magnitude of the readback signals does not require modulation of the size of the bit-islands. If used in conjunction with bit-island modulation (as shown in FIGS. 4A and 4B), then it is beneficial to balance the placement of large bit-islands between adjacent sub-tracks to prevent distortion of the amplitude associated with each sub-track. For example, if a data track includes a first sub-track having two large bit-islands, then a corresponding bottom sub-track should include two large bit-islands. In this way, the moving average quantity of the respective readback signals generated with respect to the top sub-track and the bottom sub-track remain unchanged relative to one another.

In addition to employing the relative amplitude of the readback signals to finely position the transducer head over the desired data track, the geometric size of the bit-islands can be selectively varied to generate a unique pattern of bit-islands for each data track, such that the resulting amplitude-modulated readback signal can be used to uniquely identify each data track. For example, the transducer head positioned over data track 52, moving left-to-right, alternatively senses bit-islands from sub-tracks 52a and 52b, respectively. For example, a transducer head positioned over data track 52, moving left-to-right, would sense the following pattern of bit-island sizes associated with sub-tracks 52a and 52b.

Pattern (sub-track 52a): R-L-L-R-R-R
Pattern (sub-track 52b): R-R-R-R-L-L-R

In contrast, a transducer head positioned over data track 54, moving left-to-right, would sense a slightly different pattern of bit-island sizes associated with sub-tracks 54a and 54b.

Pattern (sub-track 54a): R-L-L-R-R-R
Pattern (sub-track 54b): R-R-R-R-L-R-L

Thus, each track (i.e., combination of top sub-track and bottom sub-track) has a unique pattern of bit-island sizes. The resulting amplitude-modulated readback signal is demodulated by channel response circuitry (e.g., as shown in FIG. 2), allowing the channel response circuitry to uniquely identify the data track over which the transducer head is located without the use of a dedicated servo sector field storing the track identification data.

The exemplary embodiment shown in FIG. 4A, however, requires transducer head to distinguish between readback signals generated with respect to the top sub-track and bottom sub-track. For instance, the following pattern is generated (without the benefit of information regarding to which sub-track the signal was generated) in response to the transducer head moving over the centerline of data track 52.

Pattern (track 52): R-R-R-L-R-L-R-R-L-R-L-R-R.

An identical pattern is generated in response to the transducer head being centered in between data track 52 and data track 54. Thus, if the transducer head and associated channel response circuitry cannot distinguish between readback signals generated with respect to a top sub-track and a bottom sub-track, then channel response circuitry will be unable to determine the exact position of the transducer head. FIG. 4B illustrates an exemplary embodiment in which data track may be uniquely identified with or without information correlating the readback signal to a particular sub-track. A benefit of embodiments in which the readback signal associated with a top sub-track and a bottom sub-track can be distinguished is fewer size modulated bit-islands are required in order to uniquely identify a track as compared with embodiments in which the readback signal cannot be distinguished between a top sub-track and a bottom sub-track.

Combined with previous concepts such as those used to finely position the transducer head based on the overall magnitude of the respective readback signals (e.g., as described with respect to Equation 1), BPM 50 will not require the use of dedicated servo positional error fields to finely position a transducer head, or dedicated track information fields to uniquely identify each data track. In this way, the portions of a disc previously reserved for servo sectors may instead be allocated to data sectors, thereby increasing the overall storage capacity of BPM 50.

FIG. 4B illustrates another exemplary embodiment of patterned media 56 having track identification information encoded within the size modulations of the bit-islands. In particular, FIG. 4B illustrates a pattern of bit-island variations that allows a transducer to uniquely identify the data track regardless of whether the transducer head is able to distinguish between whether it is reading from the top sub-track or the bottom sub-track.

BPM 56 includes a plurality of data tracks, although for the sake of simplicity, only two data tracks, data track 58 and data track 60, are illustrated in FIG. 4B. Once again, each data track includes two sub-tracks (sub-tracks 58a and 58b, and sub-tracks 60a and 60b, respectively). A transducer head positioned over data track 58, moving left-to-right, alternatively senses bit-islands from sub-tracks 58a and 58b, respectively. Similarly, a transducer head positioned over data track 60 alternatively senses bit-islands from sub-tracks 60a and 60b, respectively.

As described with respect to FIGS. 3 and 4A, the variations in size of the bit-islands associated with each data track results in an amplitude modulated readback signal that is used to uniquely identify each data track. To account for situations in which the transducer head is unable to determine whether a readback signal is associated with a top sub-track or a bottom sub-track, the patterns associated with each sub-track in this embodiment include more significant differences. For instance, data sub-track 58a includes large bit-islands positioned adjacent to one another, data sub-tracks 58b and 60a include large bit-islands each separated by a regular bit-island, and data sub-track 60b includes large bit-islands separated by two regular bit-islands. As a result, regardless of whether the transducer head is able to determine whether sensed bit-islands are associated with a top sub-track or a bottom sub-track, track identification information can be uniquely identified based on the resulting amplitude-modulated readback signal.

For instance, if the transducer head is positioned over data track 58, the modulated readback signal results in the following pattern being detected:

Pattern (track 58): R-R-R-L-R-L-R-R-L-R-R-R-L

If the transducer head is positioned in between data track 58 and data track 60, the modulated readback signal results in the following, slightly different pattern being detected:

Pattern (track 60): R-R-R-L-R-R-R-L-L-R-R-R-L

Thus, regardless of whether the transducer head is able to differentiate between the top sub-track and the bottom sub-track, the position of the transducer head over data tracks 58 and 60 can be uniquely determined.

Figure 5:
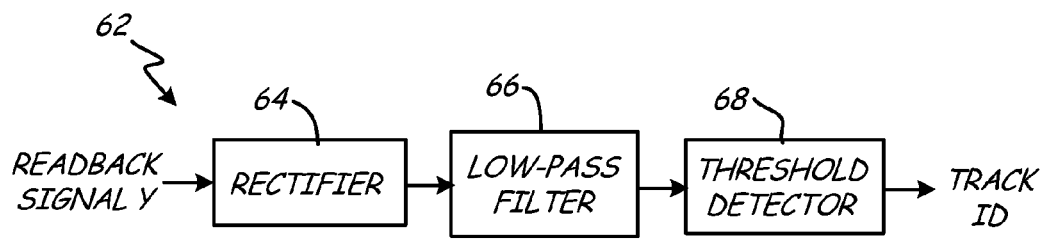
FIG. 5 is a block diagram of a synchronous demodulator employed to detect track information based on variations in bit-island size.

Based on the amplitude modulated readback signal generated by a transducer in response to variations in the size of bit-islands, channel response circuitry (e.g., as shown in FIG. 2) identifies the track over which the transducer head is located. The channel response detector would include a demodulation circuit for decoding the amplitude modulated readback signal. Such demodulation circuits are generally well known in the art. For instance, FIGS. 4 and 5 illustrate simple demodulation circuits used for envelope detection of the readback signal. Based on the detected envelope (i.e., demodulated signal), the pattern or variations in bit-island size are detected and used to identify the data track over which the transducer head is located.

FIG. 5 is a block diagram of asynchronous demodulator 62 employed by an exemplary embodiment of a disc drive system (e.g., as shown in FIG. 2) to detect track identification data based on the amplitude modulated readback signal. Asynchronous demodulator 62 includes rectifier 64, low-pass filter (LPF) 66, and threshold detector 68. A readback signal generated by a transducer head (e.g., as shown in FIG. 2) is rectified by rectifier 64. The envelope associated with the amplitude modulated signal is detected by low-pass filter 66. Threshold detector 68 compares the envelope detected by LPF 66 with a threshold value to detect the presence of large bit-islands, thereby decoding the amplitude modulated signal into a unique pattern that identifies a particular data track. The resulting track identification data is provided as feedback to allow the disc drive system to position the transducer head over the desired track.

Figure 6:
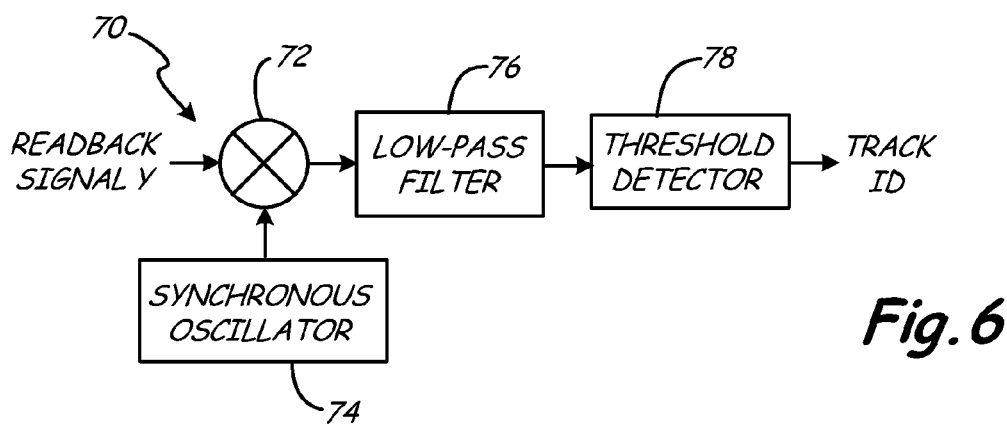
FIG. 6 is a block diagram of an asynchronous demodulator employed to detect track information based on variations in bit-island size.

FIG. 6 is a block diagram of a synchronous demodulator 70 employed in another exemplary embodiment of a disc drive system (e.g. as shown in FIG. 2) to detect track identification data based on the amplitude modulated readback signal. Synchronous demodulator 70 includes signal adder 72, synchronous oscillator 74, low-pass filter (LPF) 76, and threshold detector 78. A readback signal generated by a transducer head (e.g., as shown in FIG. 2) is combined or mixed with a synchronous signal having a frequency the same as the frequency of the readback signal. The frequency of the synchronous oscillation may be determined by monitoring the incoming readback signal, or may be known based on the speed at which the disc drive is spinning and the spacing of the bit-islands. The combined or mixed signal is provided to LPF 76 and the resulting demodulated envelope is compared with a threshold value to detect the presence of large bit-islands, thereby decoding the amplitude modulated signal into a unique pattern that identifies a particular data track. Once again, the resulting track identification data is provided as feedback to allow the disc drive system to position the transducer head over the desired track. In other embodiments, other well-known methods of demodulating and decoding the amplitude modulated readback signal may be employed.

The present invention therefore provides a patterned media topology that allows for the encoding of track identification data within data tracks. In this way, the present invention obviates the need for dedicated servo sectors traditionally used to store track identification information. Although the present invention has been described with reference to preferred embodiments, workers skilled in the art will recognize that changes may be made in form and detail without departing from the spirit and scope of the invention.

The invention claimed is:

1. A disc drive system comprising:
 a bit-patterned magnetic medium (BPM) having at least a first data track that includes a first sub-track and a second sub-track, wherein each of the first sub-track and the second sub-track are comprised of bit-islands;
 a transducer head capable of being selectively positioned over a desired data track, wherein the transducer head generates an amplitude-modulated readback signal in response to the bit-islands associated with the first sub-track and the second sub-track; and
 channel response circuitry operably connected to demodulate the readback signal generated by the transducer head, wherein the channel response circuitry detects fine positioning information based on a comparison of a readback signal generated in response to the first sub-track and a readback signal generated in response to the second sub-track of a particular data track.

2. The disc drive system of claim 1, wherein the channel response circuitry calculates a moving average quantity of the respective feedback signals defined by an equation $$PES_k = \left| \frac{y_a(k)}{y_b(k)} \right|,$$

wherein $PES_k$ is the positional error signal representing the position of transducer head over the first data track, $y_a(k)$ is the readback signal generated in response to the first sub-track and $y_b(k)$ is the readback signal generated in response to the second sub-track.

3. The disc drive system of claim 1, wherein the first sub-track is comprised of regular bit-islands having a first geometric size and large bit-islands having a second geometric size and the second sub-track is comprised of regular bit-islands having the first geometric size and large bit-islands having the second geometric size, wherein the number of large bit-islands on the first sub-track is equal to the number of large bit-islands on the second sub-track.

4. The disc drive system of claim 3, wherein positioning of the regular bit-islands and the large bit-islands on the first data track defines a unique pattern that is different than a pattern of neighboring data tracks.

5. The disc drive system of claim 4, wherein the channel response circuitry detects track identification information based on a pattern detected within the demodulated readback signal.

6. The disc drive system of claim 1, wherein the second sub-track is staggered in a cross-track direction relative to the first sub-track.

7. A method of finely positioning a transducer head over a data track having a first sub-track and a second sub-track in a bit-patterned media in which both the first sub-track and the second sub-track are comprised of bit-islands, the method comprising:
 generating an amplitude-modulated readback signal in response to the transducer head moving over the bit-islands of the first sub-track and the second sub-track;
 distinguishing between readback signals generated with respect to the first sub-track and the second sub-track of the data track;
 calculating the relative position of the transducer head relative to the first sub-track and the second sub-track based on a comparison of the readback signal generated with respect to the first sub-track with the readback signal generated with respect to the second sub-track;
 finely positioning the transducer head over the data track based on the calculated position of the transducer head.

8. The method of claim 7, wherein comparing the readback signal generated with respect to the first sub-track with the readback signal generated with respect to the second sub-track includes calculating a moving average quantity of the respective readback signals.

9. The method of claim 8, wherein the moving average quantity is defined by an equation $$PES_k = \left| \frac{y_a(k)}{y_b(k)} \right|,$$

wherein $PES_k$ is a positional error signal representing the position of transducer head over the first data track, $y_a(k)$ is the readback signal generated in response to the first sub-track and $y_b(k)$ is the readback signal generated in response to the second sub-track.

10. The method of claim 7, wherein the first sub-track is comprised of regular bit-islands having a first geometric size and large bit-islands having a second geometric size selectively positioned to create a unique pattern with respect to the data track, wherein a number of large bit-islands on the first sub-track is equal to a number of large bit-islands on the second sub-track.

11. The method of claim 10, further including:
demodulating the first and second amplitude-modulated readback signals to detect the pattern of regular bit-islands and large bit-islands associated with a particular data track;
detecting track identification data based on the detected pattern of regular bit-islands and large bit-islands; and
positioning the transducer head over a desired data track based on the detected track identification data.

* * * * *